United States Patent [19]

Kobayashi

[11] Patent Number: 5,138,246
[45] Date of Patent: Aug. 11, 1992

[54] BATTERY PROTECTING SYSTEM IN A CAR STEREO

[75] Inventor: Hiroshi Kobayashi, Saitama, Japan

[73] Assignee: Pioneer Electric Corporation, Tokyo, Japan

[21] Appl. No.: 636,790

[22] Filed: Jan. 2, 1991

[30] Foreign Application Priority Data

Jun. 21, 1990 [JP] Japan .................. 2-163133

[51] Int. Cl.⁵ .................. H02G 3/00; H02H 7/18
[52] U.S. Cl. .................. 320/13; 307/10.7
[58] Field of Search .................. 320/13, 48; 307/10.7

[56] References Cited

U.S. PATENT DOCUMENTS

| | | | |
|---|---|---|---|
| 3,979,657 | 9/1976 | Yorksie | 320/13 |
| 4,137,557 | 1/1979 | Ciarniello et al. | 307/10.7 X |
| 4,493,001 | 1/1985 | Sheldrake | 307/10.7 X |
| 4,761,631 | 8/1988 | Hwang | 307/10.7 X |
| 4,902,956 | 2/1990 | Sloan | 320/13 |

*Primary Examiner*—R. J. Hickey
*Attorney, Agent, or Firm*—Nikaido, Marmelstein, Murray & Oram

[57] ABSTRACT

A discharge detector circuit is provided for detecting a discharging state of a battery of a motor vehicle. A lower limit voltage of the battery which is a lower limit voltage for starting an engine of the vouching is detected. Power supply to a car stereo is cut off when the discharge of the battery is detected and the battery voltage decreases to the lower limit voltage.

5 Claims, 8 Drawing Sheets

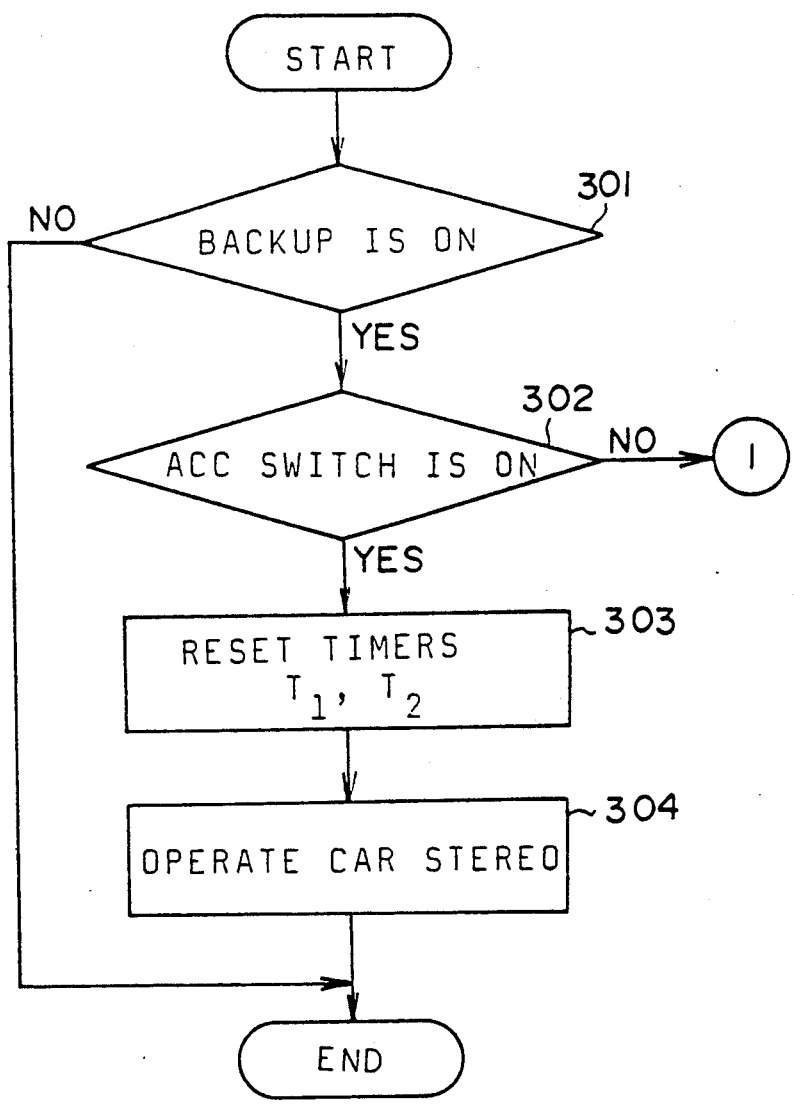

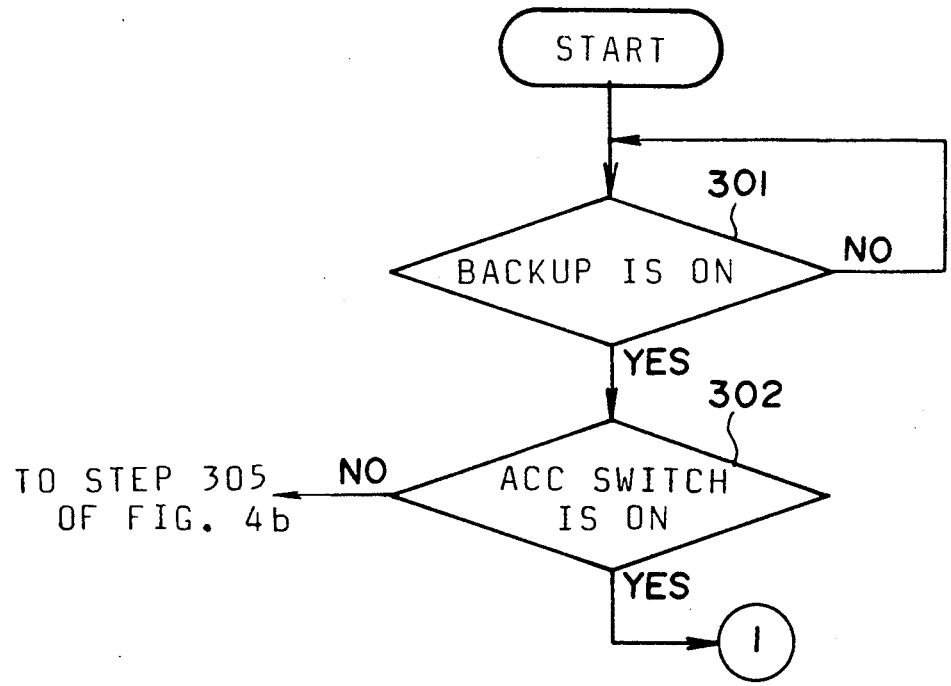

5,138,246

1

BATTERY PROTECTING SYSTEM IN A CAR STEREO

BACKGROUND OF THE INVENTION

The present invention relates to a battery protecting system in a car stereo for preventing battery voltage from decreasing below a predetermined value.

A car stereo mounted in a motor vehicle is supplied with electric power from a battery mounted in the motor vehicle when an ignition key is set to an accessory (ACC) position (FIG. 6) after stopping of the engine or an ON position during the operation of the engine. The battery mounted in the vehicle is charged during the operation of the engine.

If the ignition key is set to the ACC position and the car stereo is used for a long time, the voltage of the battery reduces, causing difficulty in starting of the engine, and shortening the life of the battery.

In a conventional motor vehicle, if the ignition key is set to an OFF position (including a LOCK position for pulling out the key), the electric power from the battery to the car stereo is cut off-key, the car stereo can not be operated and hence a passenger can not operate the car stereo.

SUMMARY OF THE INVENTION

The object of the present invention is to provide a battery protecting system in a car stereo which prevents the voltage of the battery from being reduced as a result of the operation of the car stereo in a discharging state of the battery.

According to the present invention, a battery protecting system in a car stereo is mounted in a motor vehicle. The system comprises discharge detector means for detecting a discharging state of a battery of the motor vehicle and for producing a discharge signal, first limit detector means for detecting a first lower limit voltage of the battery which is a lower limit voltage for starting an engine of the vehicle and for producing a first limit signal, cutting means responsive to the discharge signal and to the first limit signal for cutting off power supply to the car stereo.

The system further comprises second limit detector means for detecting a second lower limit voltage of the battery which is lower than the first lower limit voltage and is a lower limit voltage for operating the car stereo and for producing a second limit signal, and alarm means responsive to the second limit signal for alarming the reduction of the battery voltage.

In another aspect, the discharge detector means is detector means for detecting closing of an ignition switch.

The other objects and features of this invention will become understood from the following description with reference to the accompanying drawings.

BRIEF DESCRIPTION OF DRAWINGS

FIGS. 4a and 4b are flowcharts showing the operation of the system of FIG. 3;

FIGS. 5a and 5b are flowcharts of operation of a modification of the system of FIG. 3.

DETAILED DESCRIPTION OF THE PREFERRED EMBODIMENTS

Figure 1:
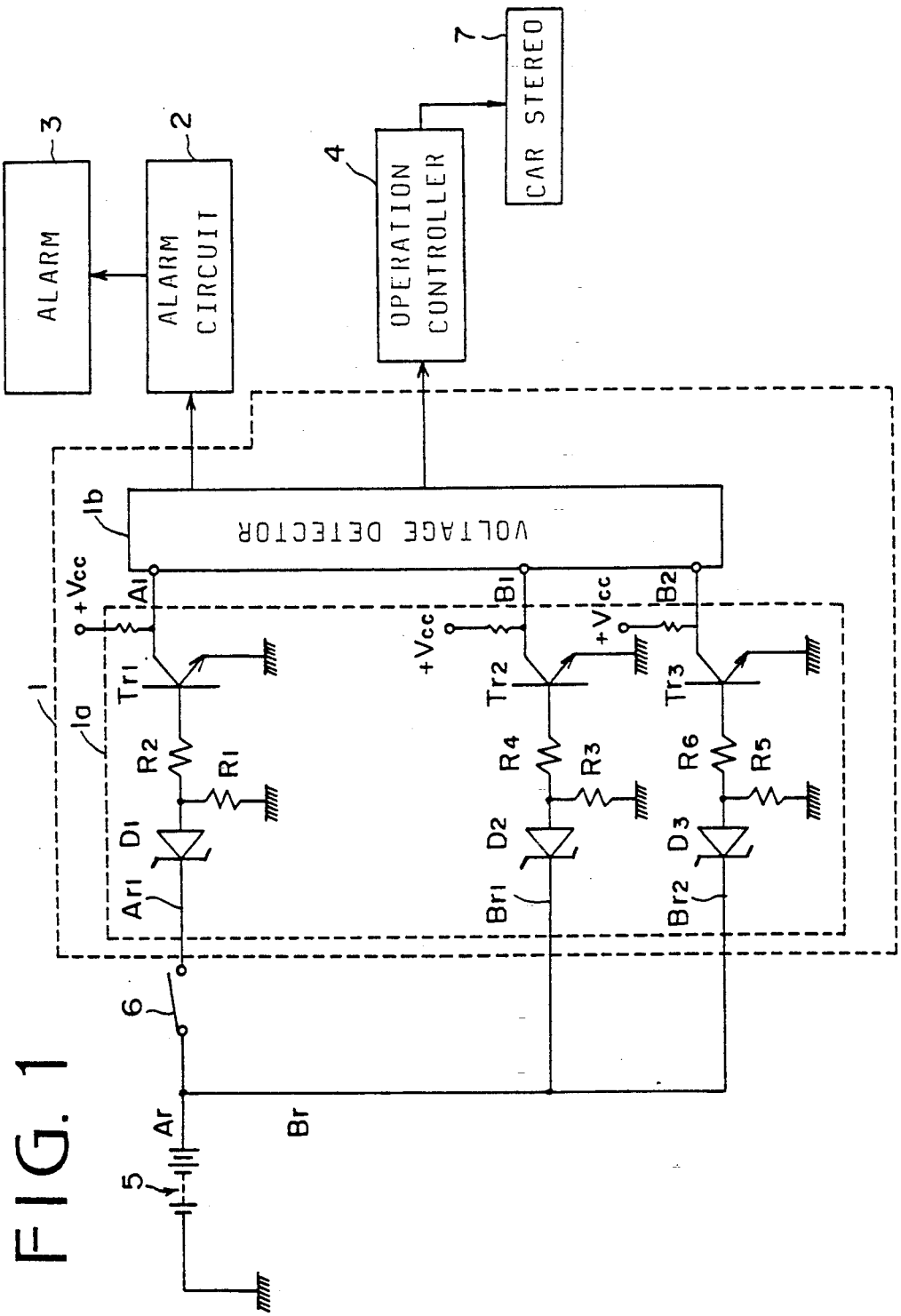
FIG. 1 is a block diagram showing a battery protecting system in a car stereo according to the present invention.

Referring to FIG. 1 showing the battery protecting system, the system has a voltage detecting circuit 1, an alarm circuit 2, an alarm 3 and an operation controller 4.

The voltage detecting circuit 1 has a sensing circuit 1a and a voltage detector 1b. A battery 5 mounted on a motor vehicle is connected to a contact of an ignition switch 6 through an ignition line Ar. The other contact of the ignition switch 6 is connected to a diode D1 of the sensing circuit 1a through a line Ar1. When the ignition switch 6 is closed during the engine operation, the battery 5 is charging. The breakdown of the diode D1 is effected with a reverse bias voltage more than 10V. The diode D1 is connected to a base of a transistor Tr1 through a resistor R2 and to ground through a resistor R1. The collector of the transistor Tr1 is connected to a level detecting terminal A1 of the voltage detector 1b.

When the transistor Tr1 is turned on, a current from a standard voltage +Vcc passes to an emitter so that the level of terminal A1 changes from a high level to a low level. Thus, the voltage detector 1b detects the charging state of the battery 5.

Further, the ignition line Ar is connected to a backup line Br which is branched into a branch line Br1 and a branch line Br2 of the sensing circuit 1a. The branch line Br1 is connected to a diode D2 which become reversely conductive with a reverse bias voltage more than 8V. The diode D2 is connected to a base of a transistor Tr2 through a resistor R4 and to ground through a resistor R3. The collector of the transistor Tr2 is connected to a level detecting terminal B1 of the voltage detector 1b.

Here, the voltage of 8V represents a second lower limit voltage which is a lower limit voltage for operating the car stereo.

The branch line Br2 is connected to a diode D3 which becomes conductive with a reverse bias voltage more than 10V. The diode D3 is connected to a base of a transistor Tr3 through a resistor R5 and to ground through a resistor R6. The collector of the transistor Tr3 is connected to a level detecting terminal B2 of the voltage detector 1b.

Here, the voltage of 10V represents a first lower limit voltage which is a lower limit voltage for starting an engine. When each of the transistors Tr2 and Tr3 is turned on, current from the standard voltage Vcc passes to an emitter of the respective transistors so that the level of the terminal B1 (B2) changes from a high level to a low level. Thus, the voltage detector 1b detects the respective first and second lower limit voltages.

Based on the levels of the terminals A1, B1 and voltage is higher than the second lower limit voltage in the charging state of the battery 5 and that the voltage is higher than the first lower limit voltage in the discharging state of the battery 5, the detector 1b produces an operation signal which is applied to the controller 4 to operate a car stereo 7. The detected result of the detector 1b is applied to the alarm circuit 2 which operated to drive the alarm 3. The alarm 3 signals and alarm condition, a light or characters. The controller 4 operates to supply or cut off an electric power to the car stereo 7 from the battery 5.

Figure 2:
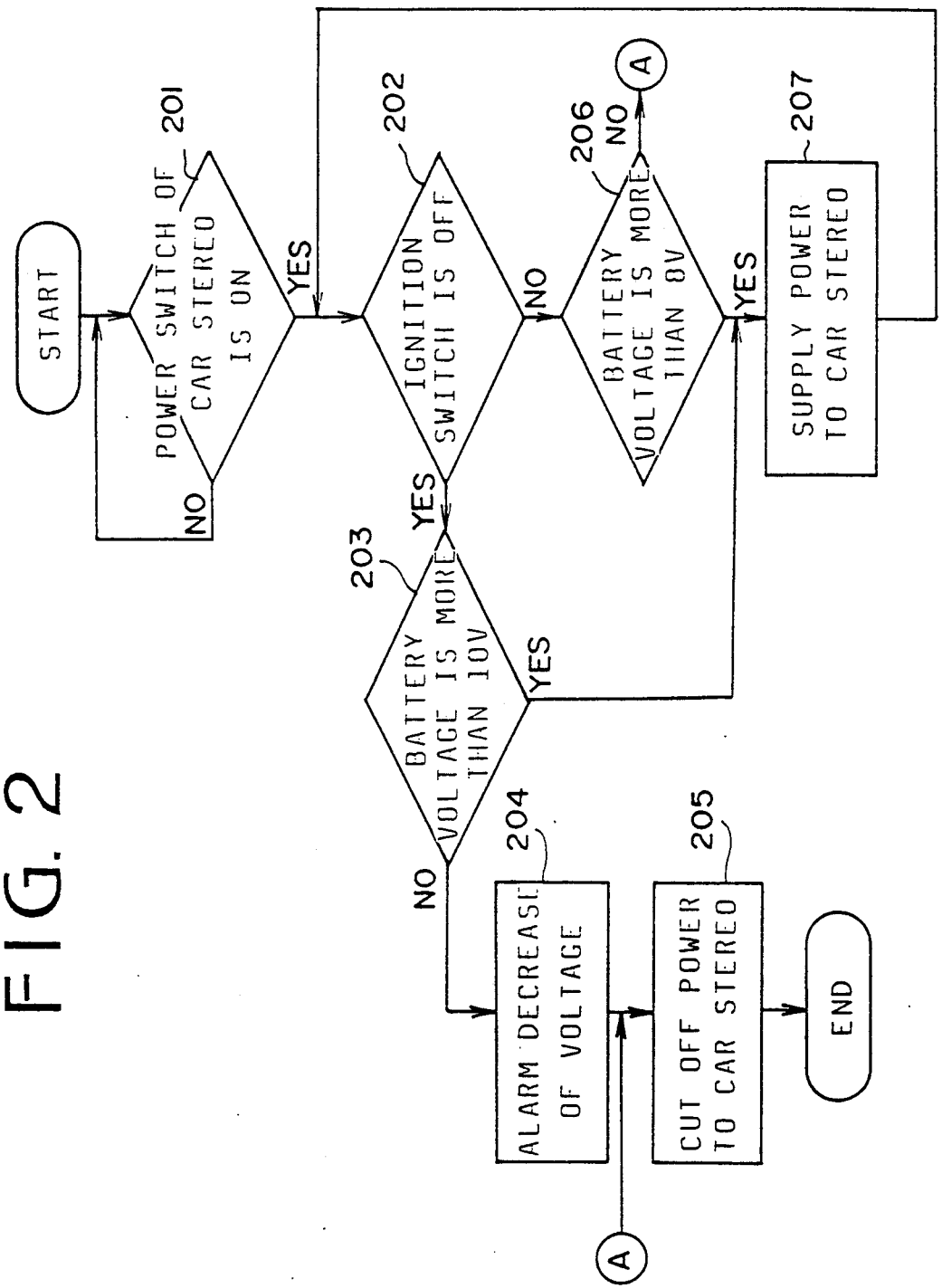
FIG. 2 is a flowchart showing the operation of the system.

The operation of the system will be described with reference to the flowchart of FIG. 2.

When a power switch of the car stereo 7 is turned on (step 201), it is determined whether the ignition switch 6 is in an OFF state or not (step 202). If the ignition switch 6 is closed, the transistor Tr1 is turned on. The current from the standard voltage +Vcc passes to the emitter so that the terminal A1 changes from the high level to the low level. Thus, the ON state of the ignition switch 6 is detected.

If the OFF state of the ignition switch 6 is determined, it is determined whether the voltage of the battery 5 is more than 10V or not (step 203). If the ignition key 6 is OFF, the battery 5 is not charged. Thus, the first lower limit voltage 10V is detected through the terminal B2.

If the voltage, is not more than 10V, the alarm 3 is operated to signal the decrease of the voltage with the buzzer, light or characters (step 204). The power from the battery 5 to the car stereo 7 is cut off (step 205).

If it is determined that the voltage is more than 10V at the step 203, the power is supplied to the car stereo (step 207).

On the other hand, at the step 202, if it is determined that the ignition switch 6 is closed, it is determined whether the voltage of the battery 5 is more than 8V or not (step 206). If the voltage is not more than 8V, the power from the battery 5 to the car stereo is cut off (step 205). If the voltage is more than 8V, the power is supplied to the car stereo (step 207).

In the embodiment, the first and second low limit voltages are detected based on the operation of the ignition switch, for supplying the power from the battery to the car stereo. Thus, the battery discharge of the voltage can be prevented before the potential of the battery reduces below the predetermined value.

Even if the ignition switch is in the off state and as far long as the voltage of the battery is not lower than the predetermined value, it is possible to operate the car stereo without using the ignition key.

Figure 3:
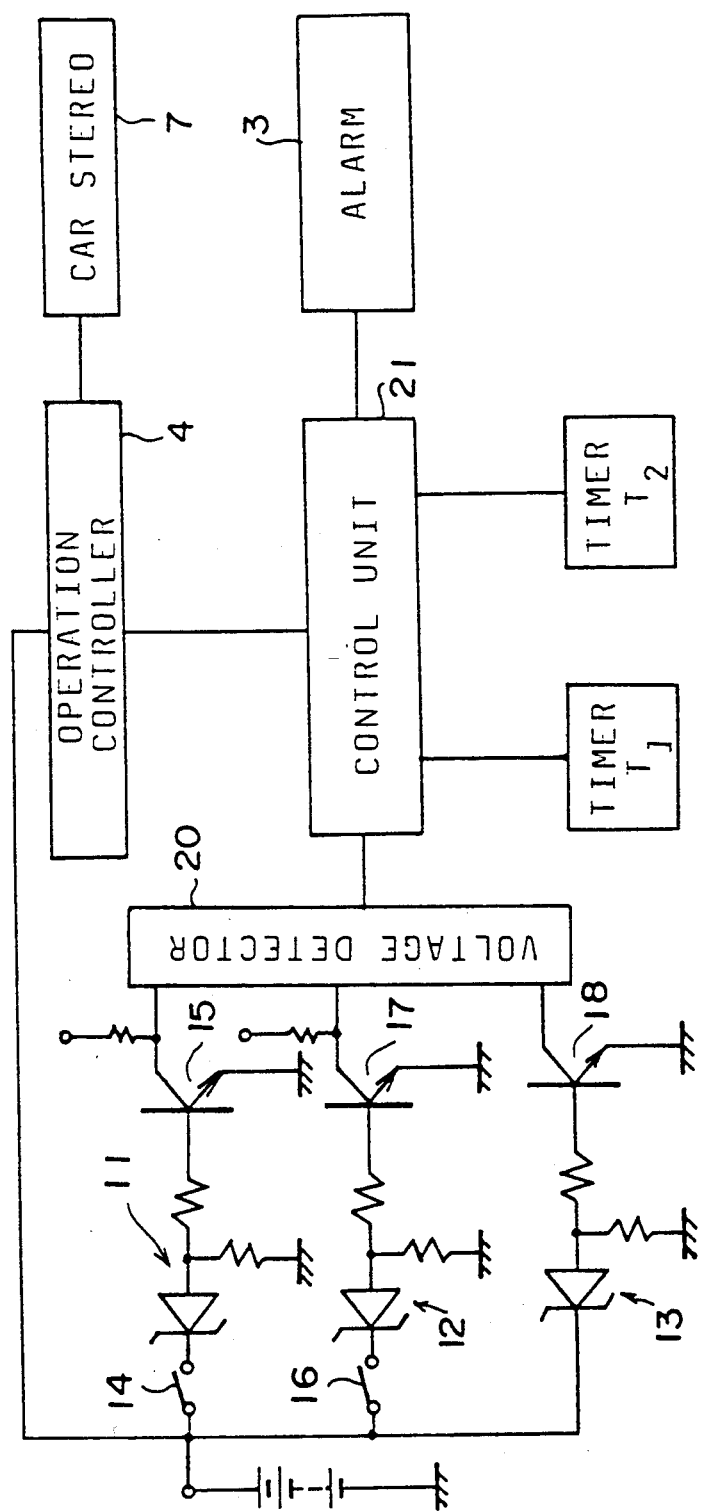
FIG. 3 is a block diagram of another embodiment of the present invention.

FIG. 3 shows a second embodiment of the present invention. The system has an ACC switch sensing circuit 11, an ignition switch sensing circuit 12, and a backup sensing circuit 13. The ACC switch sensing circuit 11 comprises an ACC switch 14 and a transistor 15. When the ACC switch 14 is closed, the transistor 15 becomes conductive. Consequently, the output of the transistor 15 goes to a low level. The ignition switch sensing circuit 12 comprises an ignition switch 16 and a transistor 17. The operation of the circuit is similar to the ACC switch sensing circuit 11. The backup sensing circuit 13 has a transistor 18 for detecting a backup voltage.

A voltage detector 20 detects the level of the output voltage of each transistor and transistor and produces an output signal dependent on the combination of the levels as described hereinafter. The output signal is applied to a control, unit 21 which applies signals to first and second timers T1 and T2, alarm 3 and operation controller 4 in accordance with the output signal. The timer T1 produces an alarm signal for signaling the second lower limit battery voltage. The timer T2 produces a signal at a time when the battery voltage lowers to the first lower limit battery voltage when the application of voltage to the car stereo is stopped.

Figure 4B:
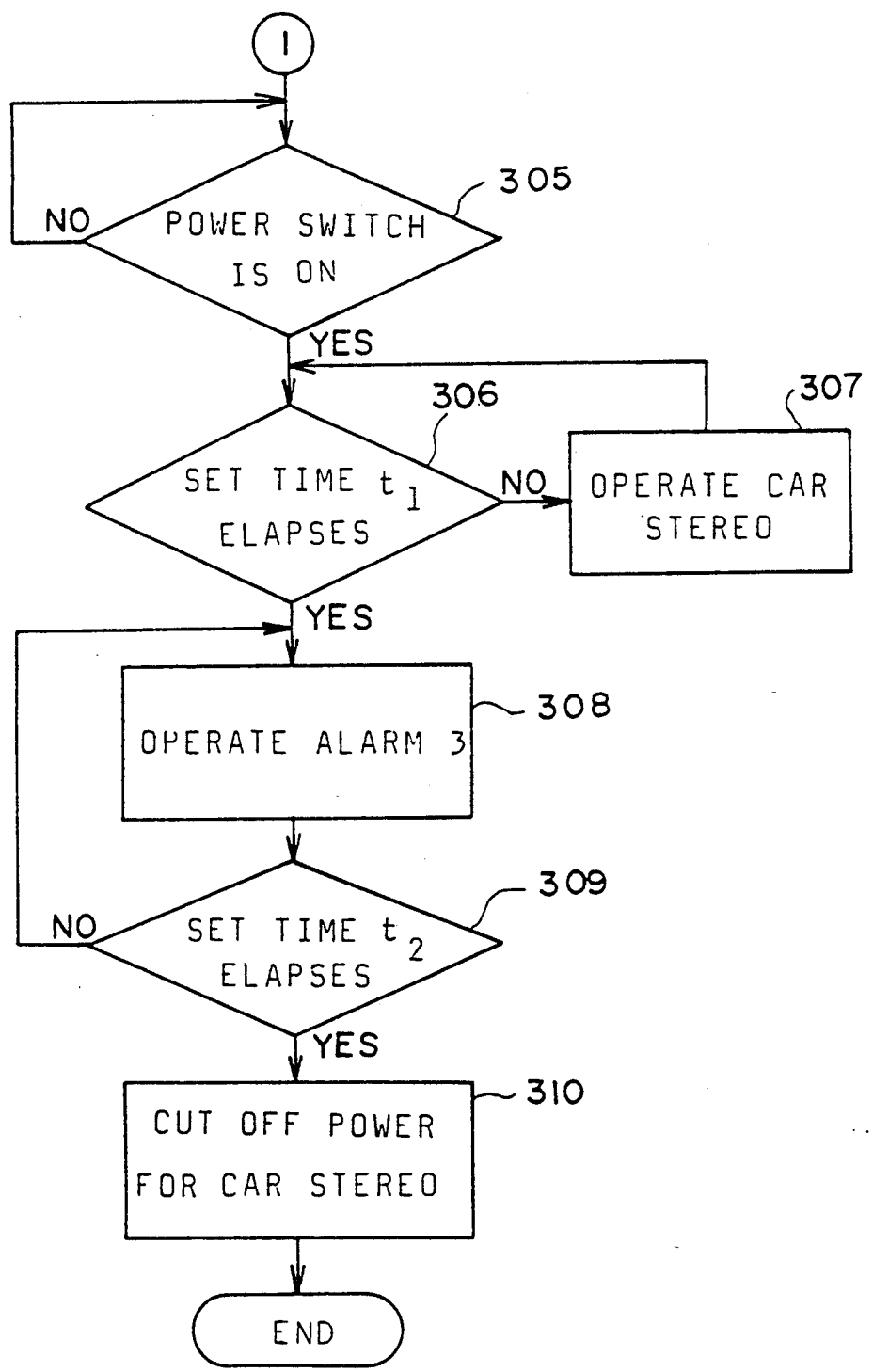

Describing the operation with reference to the flowchart of FIG. 4, at steps 301 and 302, it is determined whether the backup voltage is applied and the ACC switch 14 is closed. When the backup voltage is applied and the ACC switch is closed, it is determined that the battery is charging without detecting the operation of the ignition switch 16. At a step 303, the timers T1 and T2 are reset, and the car stereo 7 is operated (step 304).

When the ACC switch 14 is opened, it is determined that the battery is in a discharge state. At a step 305, when a power switch of the car stereo 7 is closed, it is determined whether a set time t1 of the timer T1 elapses at a step 306. When the answer is NO, the car stereo 7 is operated (step 307). When the set time t1 elapses, an alarm for informing a low battery voltage is produces from the alarm 3 (step 309). Thereafter, it is determined whether a set time t2 of the timer T2 elapses. When the set time elapses, the power supply to the car stereo 7 is cut off (step 310).

Figure 5B:
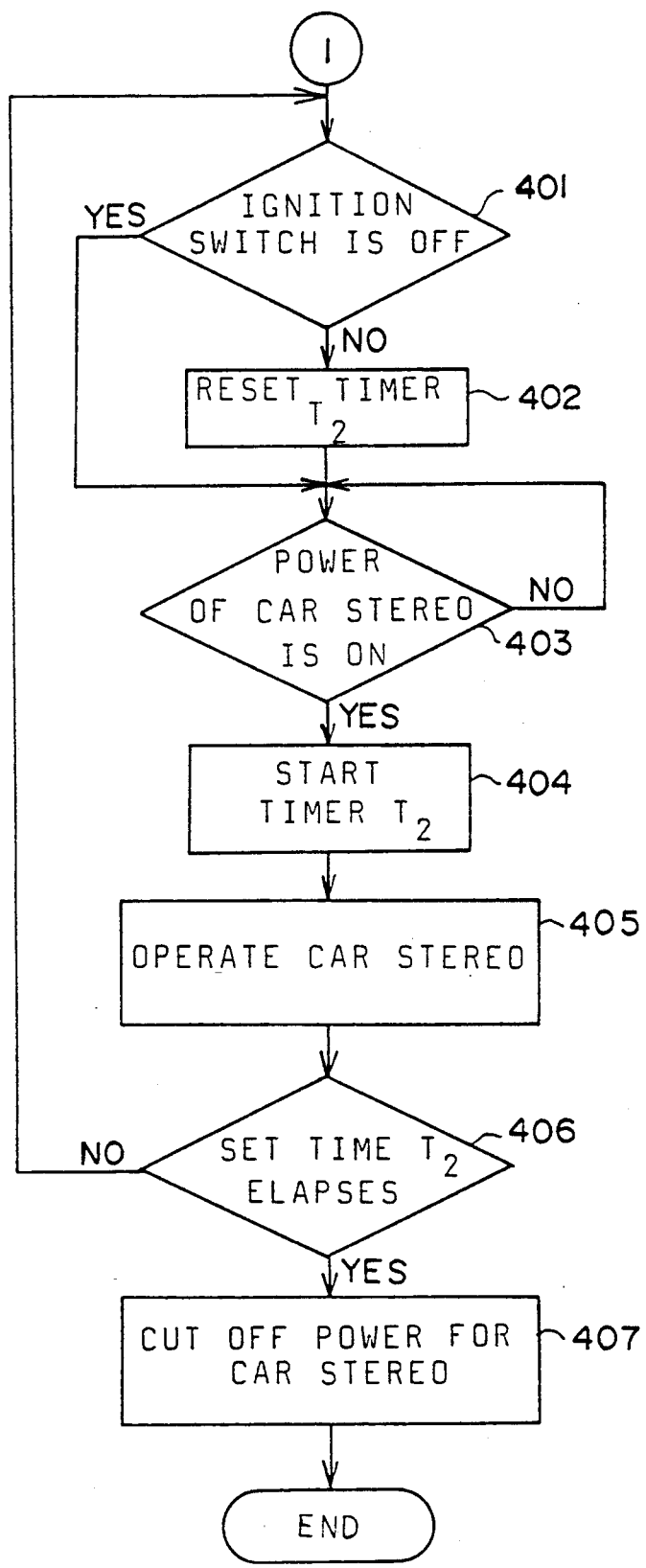
Figure 6:
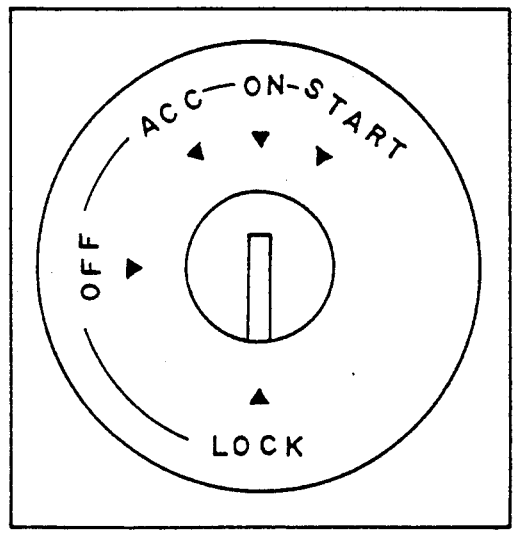
FIG. 6 is a plan view showing a dial for an ignition key.

The flowchart of FIG. 5 detects the operation of the ignition switch 16. When the ACC switch 14 is ON, it is determined whether the ignition switch 16 is OFF at a step 401. The operation of FIG. 5 does not use the timer T1. When the ignition switch is ON, it is not necessary to set the timer T2, because the battery is charging. Accordingly, the timer T2 is reset (step 402). When the power switch of the car stereo is ON at a step 403, the timer T2 is operated (step 404) and the car stereo 7 is operated (405). When the set time t2 elapses (step 406), the power for the car stereo is cut off (step 407). When ignition switch 16 is ON, the car stereo continues to operate by the program between the steps 401 and 406.

It is possible to combine the system of FIG. 1 with the system of FIG. 3 and to arrange so as to cut off the power to the car stereo when the battery voltage decreases below a predetermined value even if the set time t2 does not elapse.

What is claimed is:

1. A battery protecting system in a car stereo mounted on a motor vehicle, comprising:

charge-level detector means for detecting a state of charge of a battery of the motor vehicle and for producing a discharge signal;

first limit detector means for detecting a first lower limit voltage of the battery which is the lower limit voltage for starting an engine of the vehicle and for producing a first limit signal when battery voltage is lower than the first lower limit voltage and higher than a second lower limit voltage which is lower than the first lower limit voltage and is a lower limit voltage for operating the car stereo;

first cutting means responsive to both of the discharge signal and the first limit signal for cutting off power supply to the car stereo;

second limit detector means for detecting the second lower limit voltage of the battery and for producing a second limit signal when the battery voltage is lower than the second lower limit voltage; and second cutting means responsive to the second limit signal for cutting off the power supply to the car stereo.

2. The system according to claim 1 wherein the charge-level detector means includes detector means for detecting closing.

3. The system according to claim 2 wherein the first limit detector means includes means for detecting output voltage of the battery.

4. The system according to claim 3 wherein the second limit detector means include means for detecting output voltage of the battery.

5. The system according to claim 4 wherein the first limit detector means includes a timer.

* * * * *